United States Patent [19]

Simms et al.

[11] Patent Number: 5,108,180
[45] Date of Patent: Apr. 28, 1992

[54] DITHER ARRANGEMENTS

[75] Inventors: Graham J. Simms, Reading; Brian J. Hogg, Camberley, both of United Kingdom

[73] Assignee: British Aerospace Public Limited Company, London, England

[21] Appl. No.: 557,023

[22] Filed: Jul. 25, 1990

[30] Foreign Application Priority Data

Jul. 29, 1989 [GB] United Kingdom ............... 8917420

[51] Int. Cl.⁵ ........................................ G01C 19/70
[52] U.S. Cl. ............................................ 356/350
[58] Field of Search ........................ 356/350; 372/94

[56] References Cited

U.S. PATENT DOCUMENTS

| | | | |
|---|---|---|---|
| 4,085,825 | 4/1978 | Scarborough | 188/1 B |
| 4,115,004 | 9/1978 | Hutchings et al. | 356/106 |
| 4,309,107 | 1/1982 | McNair et al. | 356/350 |
| 4,321,557 | 3/1982 | McNair et al. | 356/350 |
| 4,349,183 | 9/1982 | Wirt et al. | 267/160 |
| 4,425,040 | 1/1984 | Ljung et al. | 356/350 |
| 4,710,027 | 12/1987 | Fersht et al. | 356/350 |
| 4,711,575 | 12/1987 | Butler et al. | 356/350 |

FOREIGN PATENT DOCUMENTS

3333306A1 9/1983 Fed. Rep. of Germany.

*Primary Examiner*—Samuel A. Turner
*Assistant Examiner*—Richard E. Kurtz, II
*Attorney, Agent, or Firm*—Nixon & Vanderhye

[57] ABSTRACT

A dither arrangement or dither spring comprises an outer portion 1 for being secured to a fixed structure, an inner mounting stub 9 for being attached to a sensor such as a laser gyro and a series of three counter-balanced inertias 10 which together have the same inertia as the sensor. The inertias 10 are connected by spoke 6 to flexible pivots 4, to which the mounting stub 9 is also connected by spokes 5.

15 Claims, 1 Drawing Sheet

DITHER ARRANGEMENTS

BACKGROUND OF THE INVENTION

1. Field of the Invention

This invention relates to dither arrangements and in particular, but not exclusively, to dither arrangements for ring laser gyroscopes.

2. Discussion of Prior Art

High accuracy laser gyroscopes require a means to overcome the "lock-in" phenomenon which is a characteristic exhibited by all laser gyroscopes. A common method of providing this means is to apply a mechanical angular oscillation to the laser gyro about its sensing axis. A dither spring may be used to produce this oscillatory motion and to support the laser gyro.

The purpose of conventional dither springs is to oscillate the gyro with respect to a fixed inertial space frame. However the angular motion of the gyro relative to its reaction inertia (i.e. its mounting base) is inversely proportional to the inertias of the gyro and its mounting base, i.e. if these inertias were equal, the gyro and mounting base would oscillate at equal amplitude, and if the mounting base had infinite inertia then all of the dither energy would be used to oscillate the gyro.

In practice, the mounting base does not have infinite inertia because every effort is made to reduce the weight and volume of the Inertial Measuring Unit (IMU) which incorporates the laser gyro(s) and this effectively limits the reaction inertia of the laser gyro mounting base. In an IMU which uses single axis laser gyros, the reaction inertia for each laser gyro comprises a casting, three accelerometers and the other two laser gyros, but in an IMU which uses a tri-axial laser three laser gyros are integrated into a single block. A single dither spring is used to oscillate the block, thereby providing oscillatory angular motion to the three laser gyros simultaneously. The reaction inertia in this arrangement is considerably less because it consists of only three accelerometers and their mount. This results in most of the dither motion being applied to the reaction inertia instead of the tri-axial laser gyro.

SUMMARY OF THE INVENTION

According to one aspect of this invention there is provided a dither arrangement comprising support means for supporting an object to be dithered, counterbalance means, and a mounting base, each of said support means, said counterbalance means and said mounting base being relatively movable, wherein said support means and said counterbalance means are each coupled by respective spring means to a flexible pivot region on said mounting base.

By this arrangement the angular oscillation applied to the object may be independent of the magnitude of the inertia of the base. Also, the coupling between the object and the counterbalance means may be increased thereby increasing dither efficiency and reducing the energy transferred to the mounting base. The object, such as a laser gyro sensor may be secured to or integral with said support means.

The dither arrangement preferably includes drive spoke means disposed between said counterbalance means and said support means for applying relative dither motion between said support means and said counterbalance means. This may help ensure that the counterbalance means and the support means move in anti-phase.

Preferably, the relative movement of said support means, said counterbalance means and said mounting base occurs about a single axis and said spring means and said spoke means extend generally radially with respect to said axis.

The counterbalance means may comprise a group of three counterbalance elements equispaced radially with respect to said axis, and two spring elements may extend between each counterbalance element and two respective regions on said mounting base.

Preferably, the inertia of the counterbalance means is generally equal to that of the object which, in use, is supported on said support means. Said support means may include three groups of two spring elements each connected to an associated one of said respective regions on said mounting base.

Preferably, the respective spring means connecting the counterbalance means to the mounting base and the support means to said base are arranged such that the node of the resultant spring system between the support means and the counterbalance means is at or adjacent the coupling of the springs to the mounting base.

The mounting base may include means for mounting one or more accelerometers. The support means, the counterbalance means and the mounting base may be formed by machining a single block of material, e.g. by an electro-discharge process.

BRIEF DESCRIPTION OF THE DRAWINGS

The invention may be performed in various ways and an embodiment will now be described, by way of example, with reference to the accompanying drawings, in which.

DETAILED DISCUSSION OF PREFERRED EMBODIMENTS

Figure 1:
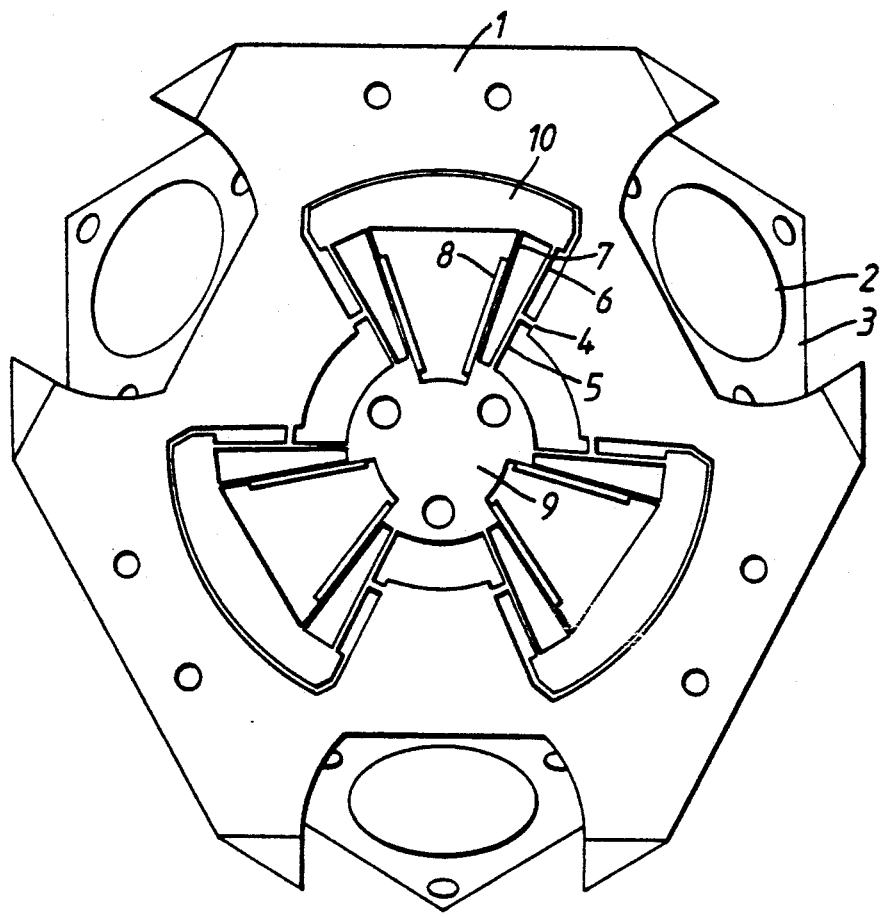
FIG. 1 is a plan view of a dither arrangement according to the invention.

The dither arrangement or dither spring is mainly of monolithic structure, formed from a single block of material by spark erosion techniques.

The outer portion 1 of the spring is the mounting base and includes three mounting holes 2 and mounting surfaces 3 for the attachment of three accelerometers.

Six flex pivots 4 support the spring system from the mounting base.

Six spokes 5 connect the flex pivots to the mounting stub 9 for the tri-axial laser gyro, these provide a spring system to allow the gyro to oscillate at the required frequency.

Six further spokes 6 connect the flex pivot to the three counter-balanced inertias 10 which collectively have the same inertia as the gyro, and the spokes provide a spring system to allow the counter-balances to oscillate at the same frequency but in anti-phase to the gyro.

Six drive spokes 7 connect the gyro mounting stub to the counter-balances. Piezo-electric elements (PZT) 8 are attached to these spokes to provide the driving force for the spring system.

A voltage supplied across the PZT's will cause the transverse dimensions of each PZT to change. As the PZT's are secured to the drive spokes 7, the spokes will then bend causing the gyro mounting stub 9 to rotate and the counterbalances to rotate in the counter-rotating direction.

If a sinusoidal voltage is applied across the PZT's, then the gyro mounting stub and the counterbalances will oscillate in anti-phase. The spokes 5 and 6 will pivot about the flex pivots 4. The amplitude of this oscillation will be greatest when the frequency of the applied voltage is equal to the natural resonant frequency of the spring system.

Figure 2:
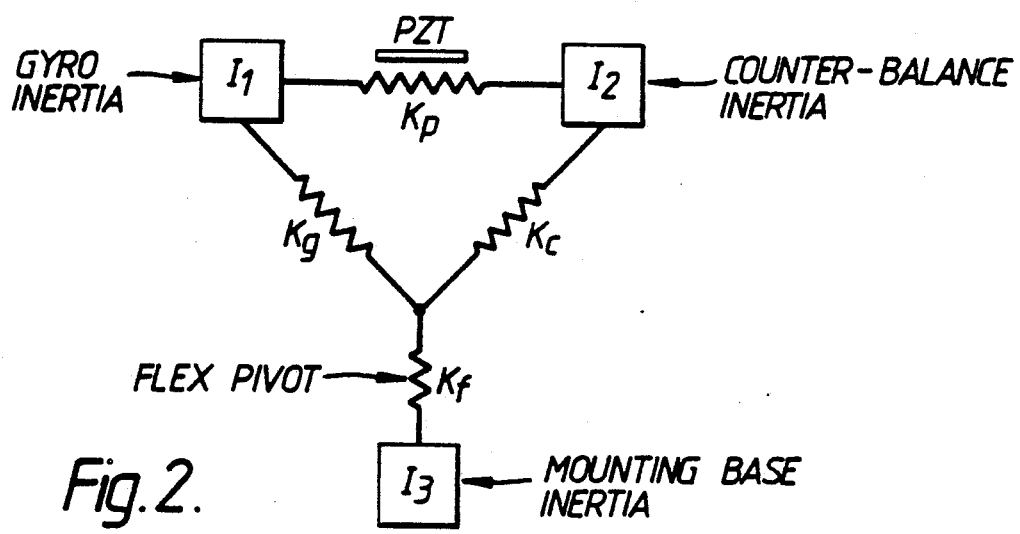
FIG. 2 is a schematic view showing the operating principle of the dither arrangement of FIG. 1.

The fundamental operating principal of this dither spring design is shown schematically in FIG. 2.

Kg represents the spring system supporting the gyro inertia and Kc represents the spring system supporting the counter-balance inertia. The PZT driving elements are shown to be placed between the two inertias, this ensures that the two inertias rotate in anti-phase. The spring systems Kg and Kc are connected via the flex pivot Kf to ground. This pivot is positioned at the node of the spring systems and ensures that minimum energy is transferred to the mounting base and that the inner and outer frequencies, coupled by the flex pivot are tuned to a single frequency in antiphase. Ideally this pivot should be a point contact to provide maximum coupling.

The illustrated embodiment is a monolithic counterbalanced dither spring which has been designed specifically for the Tri-axial laser gyro, but its principal could be adapted for a single axis laser gyro. The design has the following characteristics:

(i) It provides an angular oscillation to the laser gyro that is independent of its mounting base inertia.

(ii) It uses flexible pivot supports, which increase the coupling between the laser gyro and counterbalance, thus increasing the efficiency of dither and reducing the energy transferred to the mounting base to a negligible level.

(iii) It provides a dither spring design that includes mounting surfaces for three accelerometers, thereby eliminating the need for a separate mounting casting, saving space weight and the cost of producing extra components.

(iv) It provides a compact design consisting of a single part incorporating three spring systems and counter-balanced inertias.

We claim:

1. A dither arrangement comprising:
support means for supporting an object to be dithered, counterbalance means,
a mounting base, and
means for pivotally interconnecting each of said support means, said counterbalance means and said mounting base, wherein said means for pivotally interconnecting comprises respective spring means for coupling said support means and said counterbalance means to a flexible pivot region on said mounting base, said pivot region comprising a means for coupling vibrational energy between said support means and said counterbalance means.

2. A dither arrangement according to claim 1, which includes drive spoke means disposed between said counterbalance means and said support means for applying relative dither motion between said support means and said counterbalance means.

3. A dither arrangement according to claim 2, wherein said relative movement of said support means, said counterbalance means and said mounting base occurs about a single axis and said spring means and said spoke means extend generally radially with respect to said axis.

4. A dither arrangement according to claim 3, wherein said counterbalance means comprises a group of three counterbalance elements equispaced radially with respect to said axis.

5. A dither arrangement according to claim 4, wherein two spring elements extend between each counterbalance element and two respective regions on said mounting base.

6. A dither arrangement according to claim 4, wherein said support means includes three groups of two spring elements each connected to an associated one of said respective regions on said mounting base.

7. A dither arrangement according to claim 1, wherein the respective spring means connecting the counterbalance means to the mounting base and the support means to said base are arranged such that the node of the resultant spring system between the support means and the counterbalance means is at or adjacent the coupling of the springs to the mounting base.

8. A dither arrangement according to claim 1, wherein the counterbalance means and the sensor means move in anti-phase.

9. A dither arrangement according to claim 1, wherein the inertia of the counterbalance means is generally equal to that of the object which, in use, is supported on said support means.

10. A dither arrangement according to claim 1, wherein the object is a laser gyro sensor.

11. A dither arrangement according to claim 1, wherein the mounting base includes means for mounting one or more accelerometers.

12. A dither arrangement according to claim 1, wherein said support means, said counterbalance means and said mounting base are formed by machining a single block of material.

13. A dither arrangement comprising:
support means for supporting an object to be dithered;
counterbalance means;
a mounting base, each of said support means, counterbalance means and said mounting base being relatively angularly movable about a common axis, said counterbalance means comprising at least one counterbalance mass equispaced about said axis;
a first spring system connecting said counterbalance means to respective flexible pivot regions capable of resilient pivoting movement relative to said mounting base;
a second spring system connecting said support means to said flexible pivot regions whereby vibrational energy may be transferred via said pivot regions between said support means and said counterbalance means; and
a third spring system extending between said counterbalance means and said support means having associated therewith drive means for exciting relative movement of said support means and said counterbalance means in antiphase.

14. A dither arrangement according to claim 13, wherein said support means, said counterbalance means, said mounting base and said first, second and third spring systems are integrally formed from a single block of material.

15. A dither arrangement according to claim 14, wherein said support means and said counterbalance means are provided radially within said mounting base.

* * * * *